United States Patent [19]

Sager

[11] Patent Number: 5,421,188

[45] Date of Patent: Jun. 6, 1995

[54] PROVING MEANS AND METHOD

[75] Inventor: Leonard J. Sager, Marlton, N.J.

[73] Assignee: Texaco Inc., White Plains, N.Y.

[21] Appl. No.: 142,013

[22] Filed: Oct. 28, 1993

[51] Int. Cl.$^6$ .............................................. G01F 25/00
[52] U.S. Cl. ............................................ 73/3; 364/510
[58] Field of Search .................. 73/3; 364/510, 517.04

[56] References Cited

U.S. PATENT DOCUMENTS

| | | | |
|---|---|---|---|
| 3,580,045 | 5/1971 | Pfrehm | 73/3 |
| 4,590,790 | 5/1986 | Hicks et al. | 73/3 |
| 4,649,734 | 3/1987 | Hillburn | 73/3 |
| 4,953,386 | 9/1990 | Pearman et al. | 364/510 |
| 5,107,441 | 4/1992 | Decker | 73/3 |

Primary Examiner—Richard E. Chilcot, Jr.
Assistant Examiner—Max H. Noori
Attorney, Agent, or Firm—James L. Bailey; Kenneth R. Priem; William J. Beard

[57] ABSTRACT

The apparatus and method proves to be the use of the pipeline carrying a petroleum fluid. A through-put pipe having a meter to be proved, and the bypass pipe are connected with valves to the pipe line so that petroleum fluid may be caused to fall either through the through put pipe or the bypass pipe. A prover is spatially arranged with a bypass pipe and measures a fluid flow in the bypass pipe. At least one sensor arranged with a through-put pipe senses a physical characteristic of the petroleum stream flowing the through-put pipe. A computer which includes memories having stored the meter's manufacturers' performance data, is at work for determining the type of curve generated by the stored performance data, a circuit for fitting data generated by the prover to the determined type of curve.

2 Claims, 7 Drawing Sheets

FIG. 4

| K.C. METER K0102M | | | |
|---|---|---|---|
| PROVING DATE | TEMP. (F) | FLOW (BPH) | METER FACTOR |
| 11/9/81 | 47.5 | 100 | 0.9974 |
| 1/8/82 | 22.2 | 104 | 0.9969 |
| 2/25/82 | 38.3 | 96 | 0.9988 |
| 4/22/82 | 49.2 | 90 | 0.9987 |
| 6/25/82 | 71.7 | 90 | 1.0009 |
| 8/31/82 | 78.6 | 88 | 1.0024 |
| 11/10/82 | 44.7 | 86 | 0.9966 |
| 2/24/83 | 44.0 | 88 | 0.9981 |
| 5/27/83 | 69.3 | 88 | 1.0015 |
| 8/18/83 | 94.1 | 94 | 1.0034 |
| 9/26/83 | 69.8 | 92 | 1.0009 |
| | | 102 | 1.0003 |
| | | 82 | 0.9951 |
| | | | 0.9989 |

D.C. METER NO. 2 GASOLINES — page 4.

| TEMP 69–72.9F | | TEMP 73–76.9F | | TEMP 77–80.9F | | TEMP 81–84.9F | |
|---|---|---|---|---|---|---|---|
| FLOW (BPH) | METER FACTOR | FLOW (BPH) | METER FACTOR | FLOW (BPH) | METER FACTOR | FLOW (BPH) | METER FACTOR |
| 4795 | 1.0043 | 4561 | 1.0041 | 5172 | 1.0043 | 6640 | 1.0047 |
| 5150 | 1.0046 | 4853 | 1.0039 | 5163 | 1.0043 | 4630 | 1.0043 |
| 5650 | 1.0048 | 5047 | 1.0040 | 5124 | 1.0043 | 5010 | 1.0045 |
| 5700 | 1.0049 | 6092 | 1.0042 | 5100 | 1.0043 | 5470 | 1.0045 |
| 5402 | 1.0045 | 6896 | 1.0043 | 6361 | 1.0044 | 6018 | 1.0044 |
| 5450 | 1.0044 | 6421 | 1.0042 | 4513 | 1.0044 | 5693 | 1.0046 |
| 5367 | 1.0046 | | | 5169 | 1.0043 | 6794 | 1.0045 |
| 4646 | 1.0043 | | | 3209 | 1.0040 | 6544 | 1.0045 |
| 5105 | 1.0046 | | | 5469 | 1.0047 | 6794 | 1.0045 |
| 4130 | 1.0044 | | | 5520 | 1.0042 | 6544 | 1.0045 |
| 5711 | 1.0044 | | | 6758 | 1.0047 | | |
| 5692 | 1.0045 | | | 6313 | 1.0043 | | |
| 5079 | 1.0041 | | | 5024 | 1.0044 | | |

PROVING MEANS AND METHOD

BACKGROUND OF THE INVENTION

Field of the Invention

Present invention relates to metering means and methods in general, and, more particularly, for proving meters.

SUMMARY OF THE INVENTION

The apparatus and method proves to be the use of the pipeline carrying a petroleum fluid. A through-put pipe having a meter to be proved, and the bypass pipe are connected with valves to the pipe line so that petroleum fluid may be caused to fall either through the through put pipe or the bypass pipe. A prover is spatially arranged with a bypass pipe and measures a fluid flow in the bypass pipe. At least one sensor arranged with a through-put pipe senses a physical characteristic of the petroleum stream flowing the through-put pipe. A computer which includes memories having stored the meter's manufacturers' performance data, is at work for determining the type of curve generated by the stored performance data, a circuit for fitting data generated by the prover to the determined type of curve.

The objects and advantages of the present invention will fully hereinafter from the consideration of the detailed description which follows, taken together with the accompanying drawings wherein one embodiment does the invention as illustrated by way of example. It is to be expressly understood, however, that the drawings are for illustration purposes only and not to be construed as defining the limits of the invention.

DESCRIPTION OF THE INVENTION

The present invention provides for the monitoring of a meter in a petroleum pipeline system for its accuracy, although it can be used to monitor meters in other types of systems too.

Figure 1:
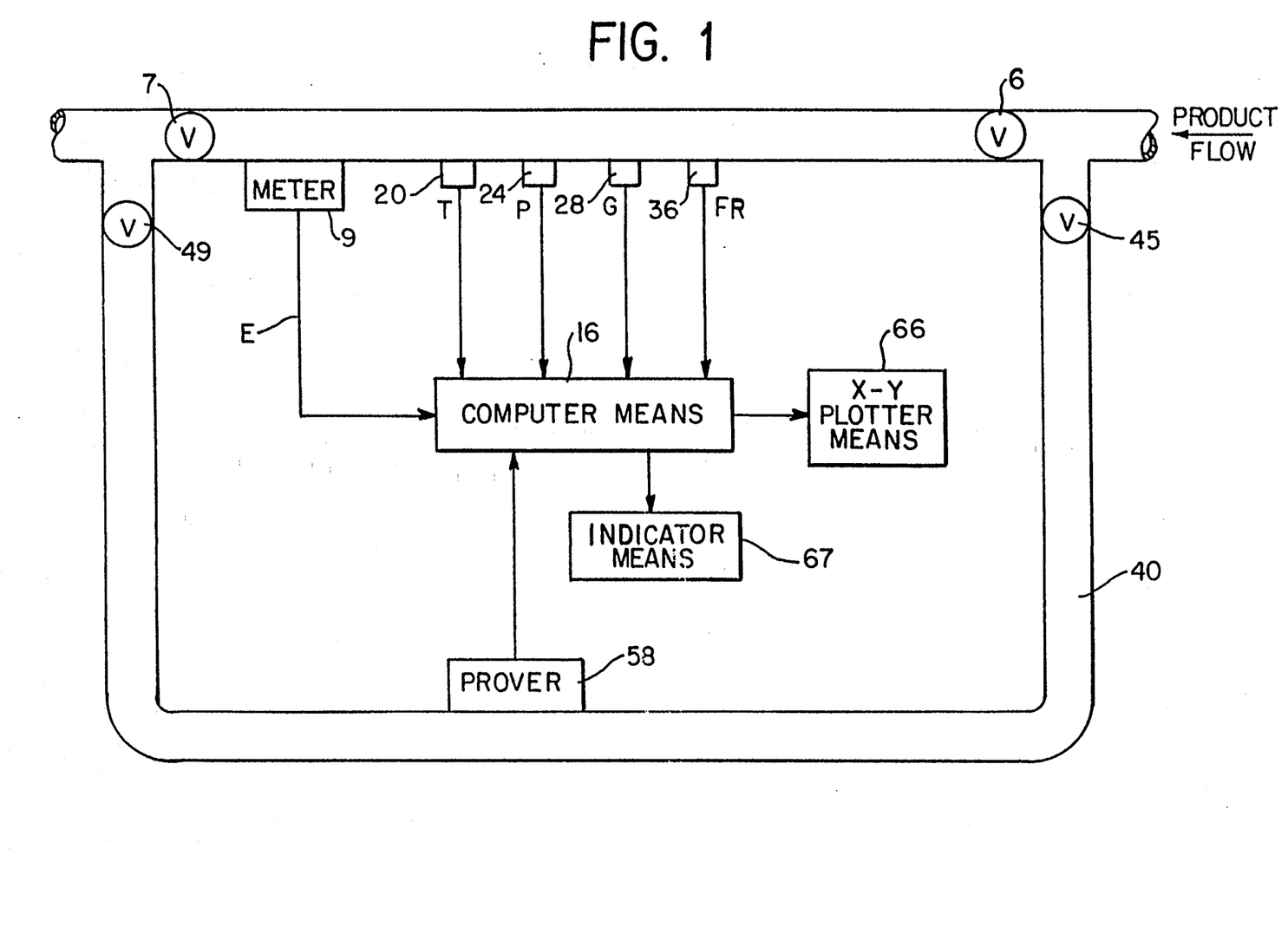
FIG. 1 is a schematic diagram of the invention proving a meter monitoring the product flow in a pipeline.

Referring now to FIG. 1, there is shown a product which may be crude oil, gasoline, diesel fuel or any other petroleum product flowing through a pipeline 5 having valves 6 and 7. Associated with pipeline 5 is a meter 9 which provides a signal E related to the quantity of product flowing in line 5 and is generally expressed in the units of barrels. Meter 9 may be any type of meter that is normally used in such endeavors. It may be a positive discharge-type meter or a turbine meter. In the present application, a conventional type positive discharge meter is being used. Signal E is provided to computer means 16. A temperature sensor 20 providing a signal T representative of the temperature of the fluid in line 5. A pressure sensor 24 senses the pressure of the fluid and provides a pressure signal P. A gravity sensor 28 provides a gravity signal G corresponding to the gravity of the fluid and a flow rate meter 36 provides a signal FR corresponding to the flow rate of the liquid. Signals T, P, G and FR are provided to computer means 16, however, not all of the signals T, P, G & FR need be provided. For example, signal G represents the gravity of the liquid, in many cases the liquid is a product which meets certain specifications, such as gasoline or No. 2 diesel. As a result, sufficient data about the gravity of the product may be known and may be pre-entered or operator entered into computer means 16.

A side loop consists of a pipe prover 40 having valves 45 and 49. Associated with pipe prover 40 is a counter 58 which is used to prove the accuracy of meter 9. The count in counter 58 represents a barrel of liquid and is used to test the accuracy of meter 9. The proving of a meter, such as meter 9, is well known in the industry. Suffice to say that prover 40 acts as a reference for meter 9. Prover 40 may be of the type manufactured by the Metric Corp. as a bi-directional mechanical displacement prover.

Outputs of computer means 16 are provided to an X, Y plotter mean 66, which plots the meter factors versus flow temperature, pressure or whatever parameter an operator chooses. Computer means 16 also provides an output to indicator means 67 as hereinafter explained.

Figure 2:
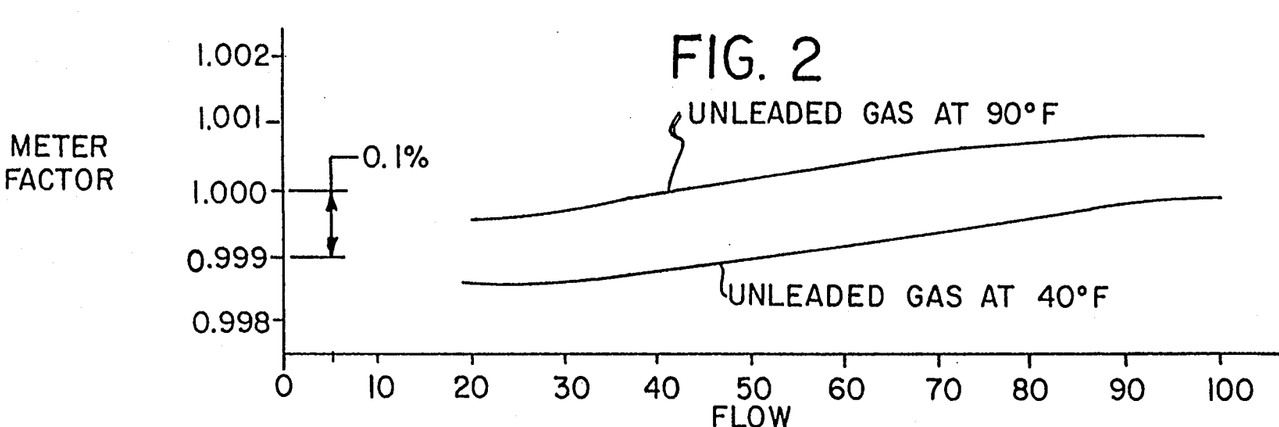
FIGS. 2 and 3 are plots of meter factors from the proving of meters for different parts.
Figure 3:
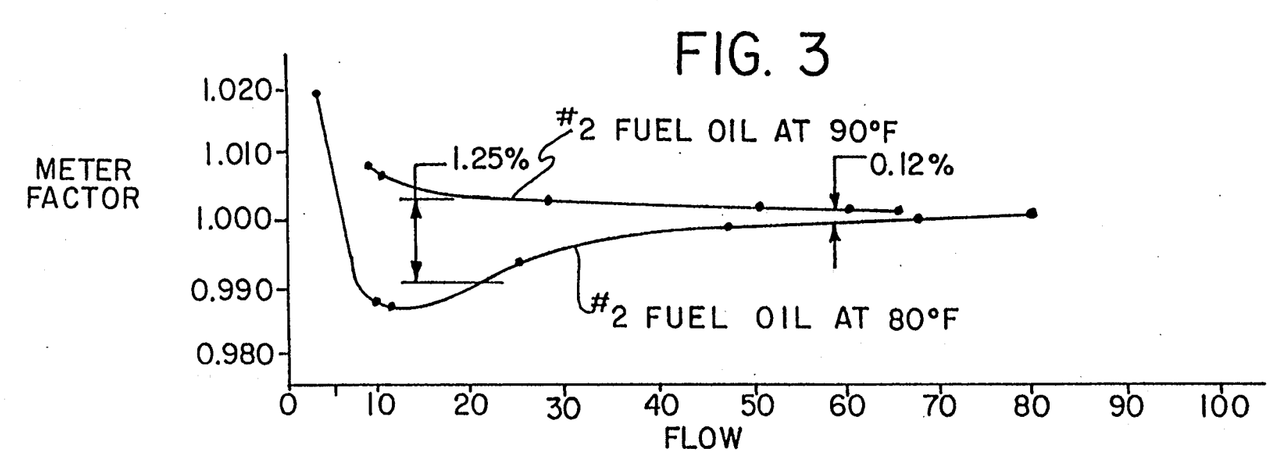

The present invention utilizes the performance curves for meter 9 provided by the manufacturer of meter 9. Typical curves are shown in FIGS. 2 and 3 where FIG. 2 is a pressure differential-type meter performance shift with temperature in which unleaded gasoline was metered at 90° F. and at 40° F. for flow rates at 20% or 100% of maximum rated of flow rate. Similarly, a turbine-type meter performance shift with temperature is shown in FIG. 3 in which No. 2 fuel oil was flowing at 90° F. and at 80° F.

Referring again to FIG. 1, the meters are proved on a regular basis, in which case meter 9 is proved in cooperation with prover 40 and the information of temperature, pressure, gravity and flow rate are fed into computer means 16. The proving of meter 9 established a meter factor for meter 9. The meter factor will change over a period of time due to the wear and tear on meter 9. The meter factor is the ratio of the reading by meter 9 to the reading of the count in counter 58. The meter factor also varies as a function of the product parameters such as gravity, temperature, pressure and flow rate.

Figure 4:
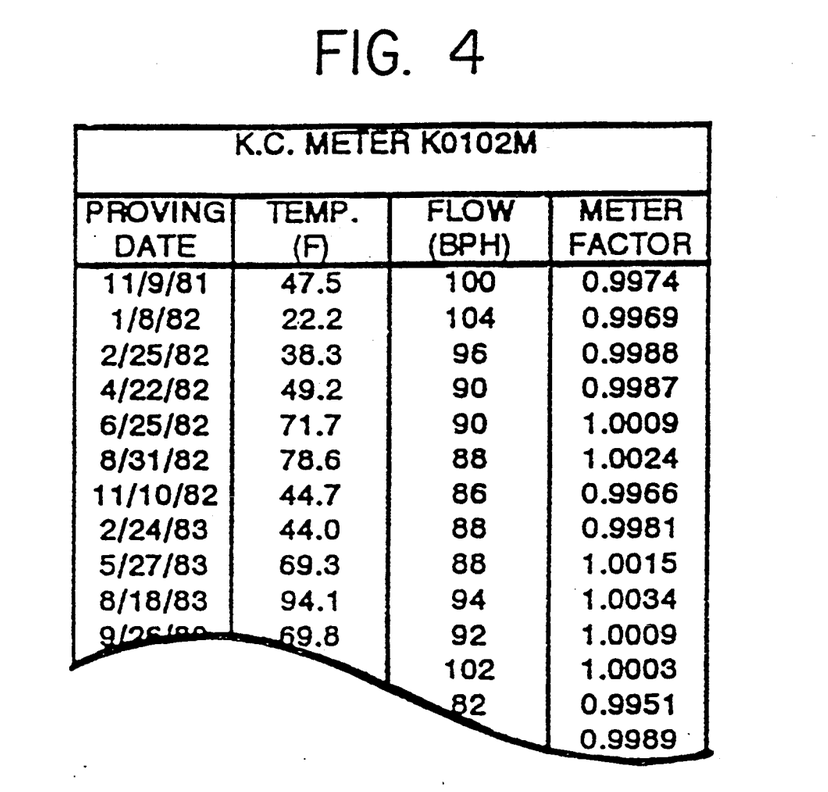
FIG. 4 is a representation of proving data for a particular meter.
Figure 5:
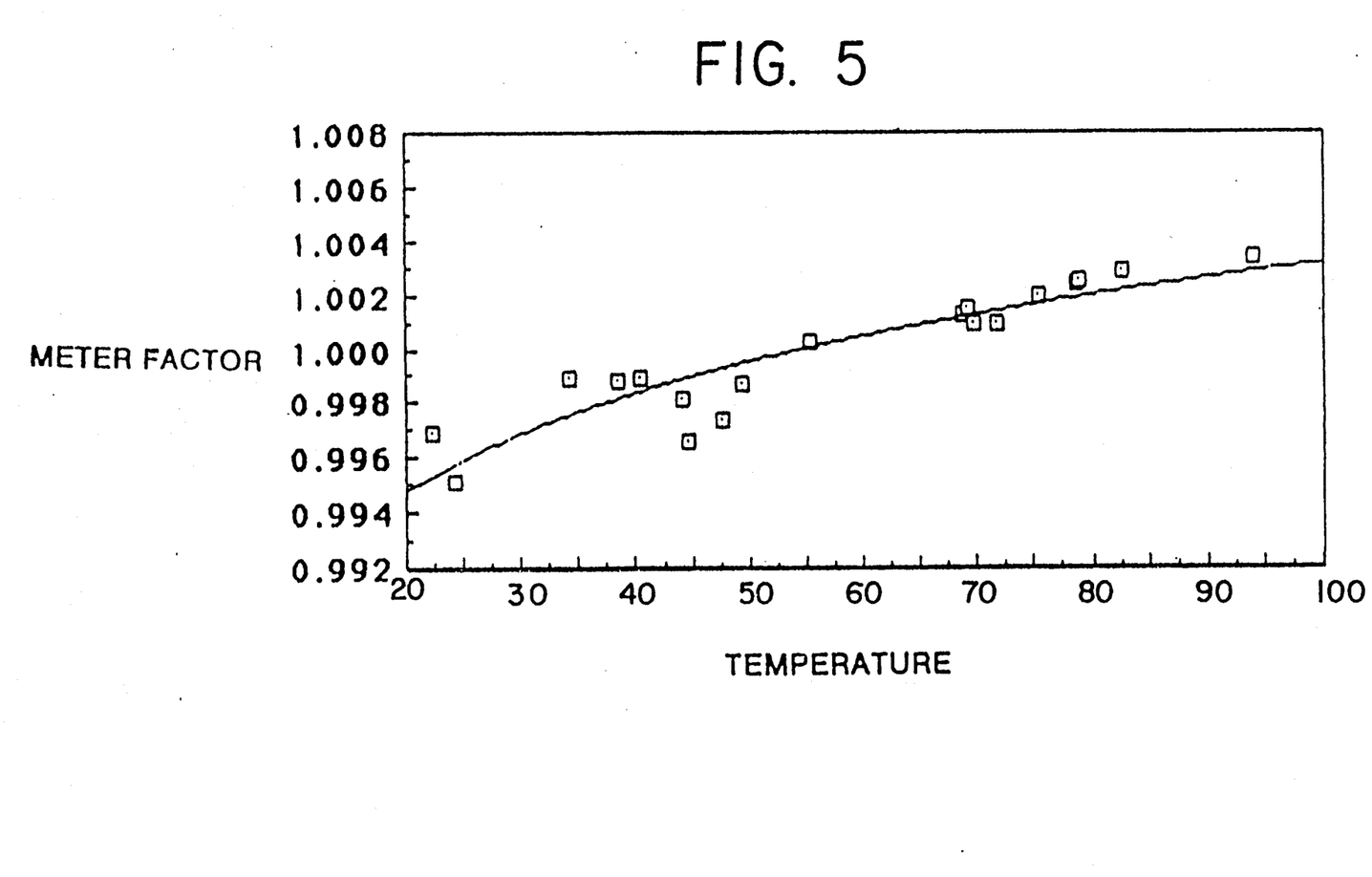
FIG. 5 is a plot of meter factor versus temperature.

Further, shown in FIG. 4 is a record of typical provings of a crude gathering meter in a Kansas City area facility area in which there is provided a proving date for each proving, the temperature in degrees fahrenheit, the flow in barrels per hour and the resulting meter factor. FIG. 5 is a plot of the information shown in FIG. 4.

Figure 6:
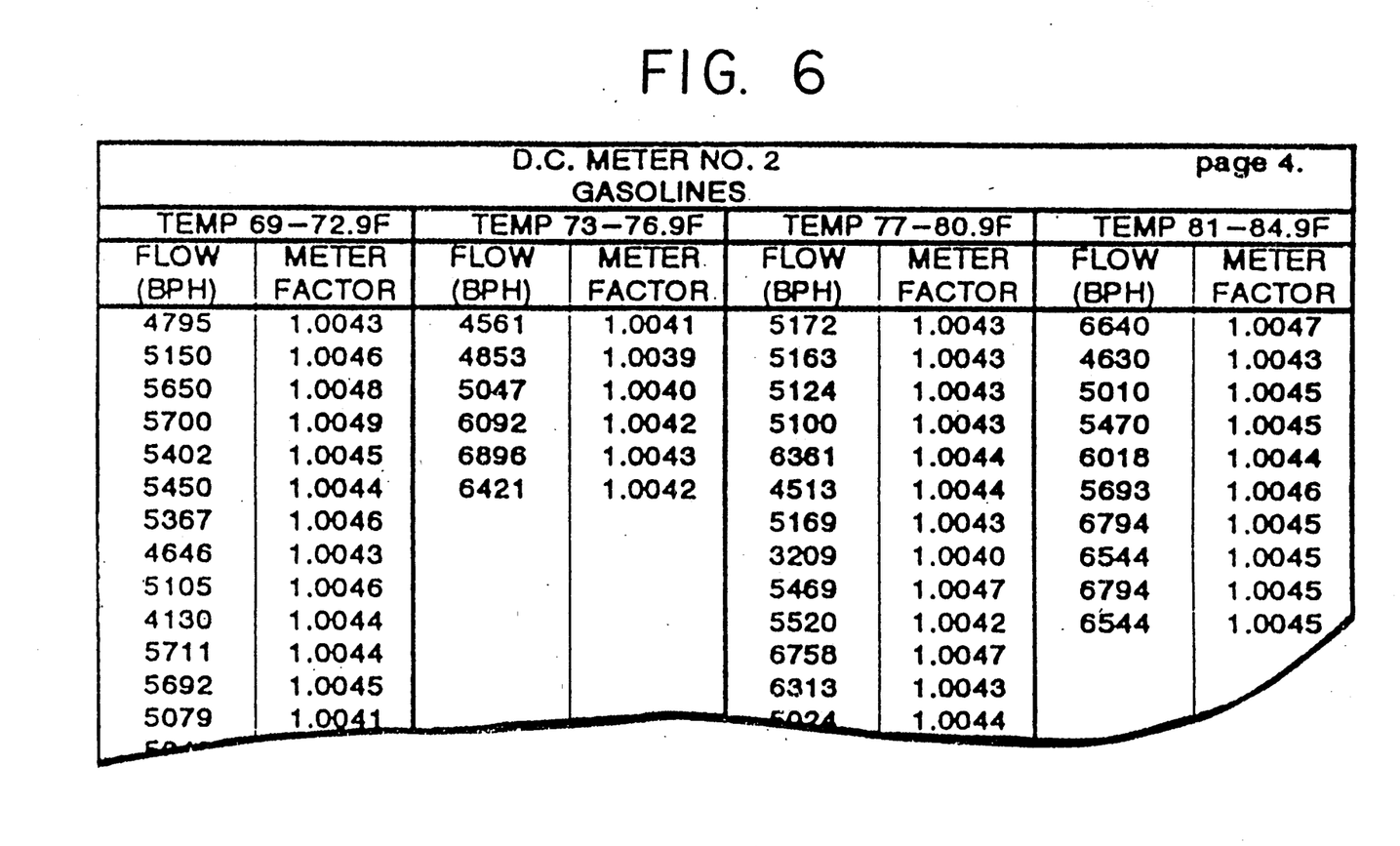
FIG. 6 is proving data of another meter.
Figure 7A:
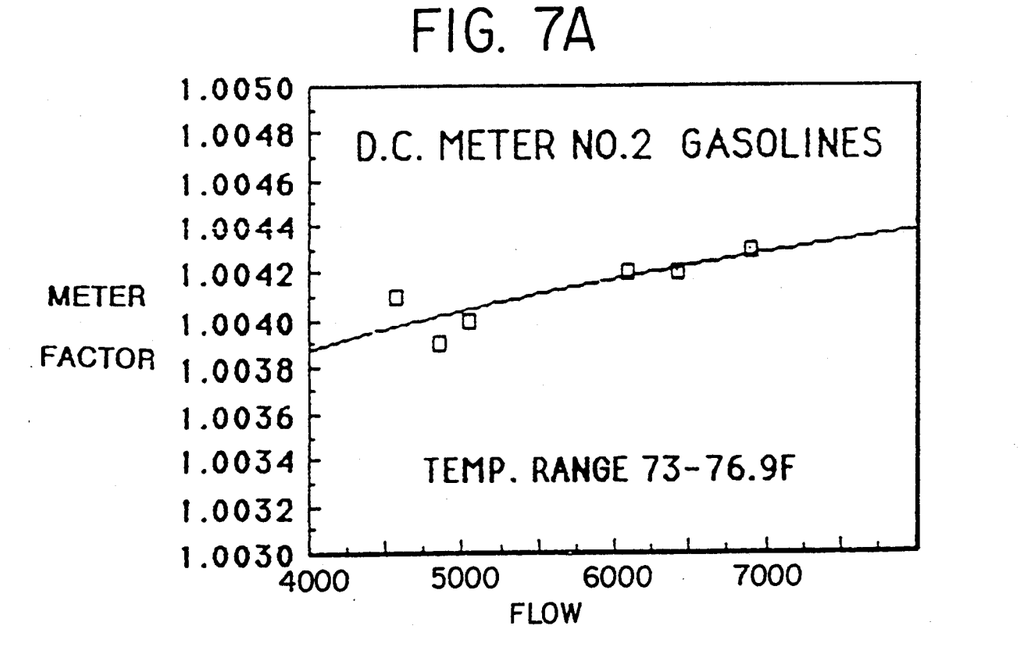
FIGS. 7a and 7b represent plots of meter factor versus flow for gasolines in different temperature ranges.
Figure 7B:
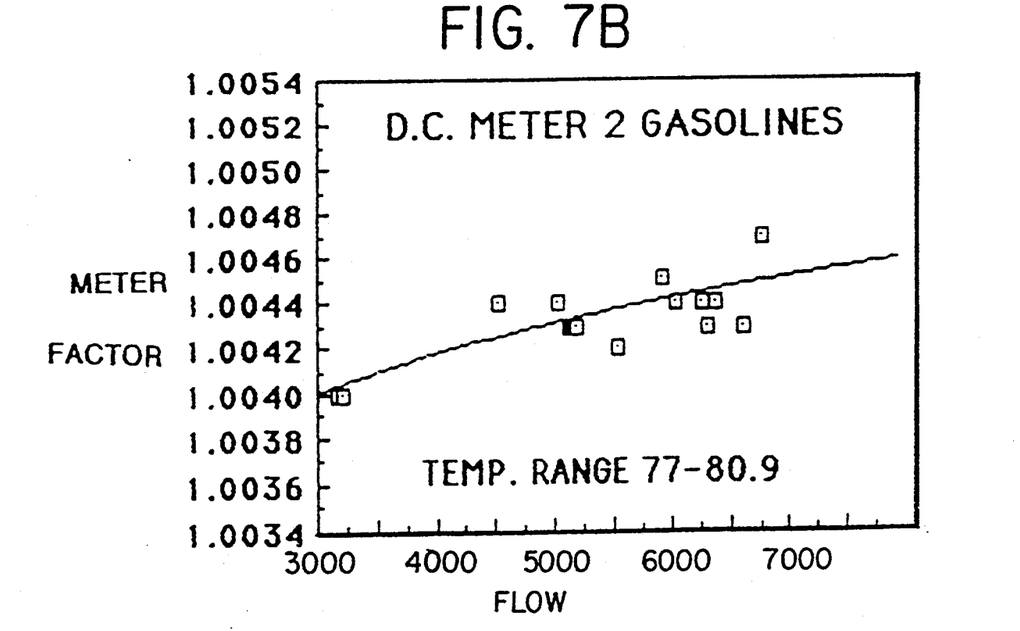

Although the meter that is the subject of FIG. 4 is a crude gathering meter, the present invention is also applicable to product meters as well. FIG. 6 shows a portion of the proving of a meter at Texaco's Delaware City facility with FIGS. 7A and 7B being just two plots of the information shown in FIG. 6.

Figure 8:
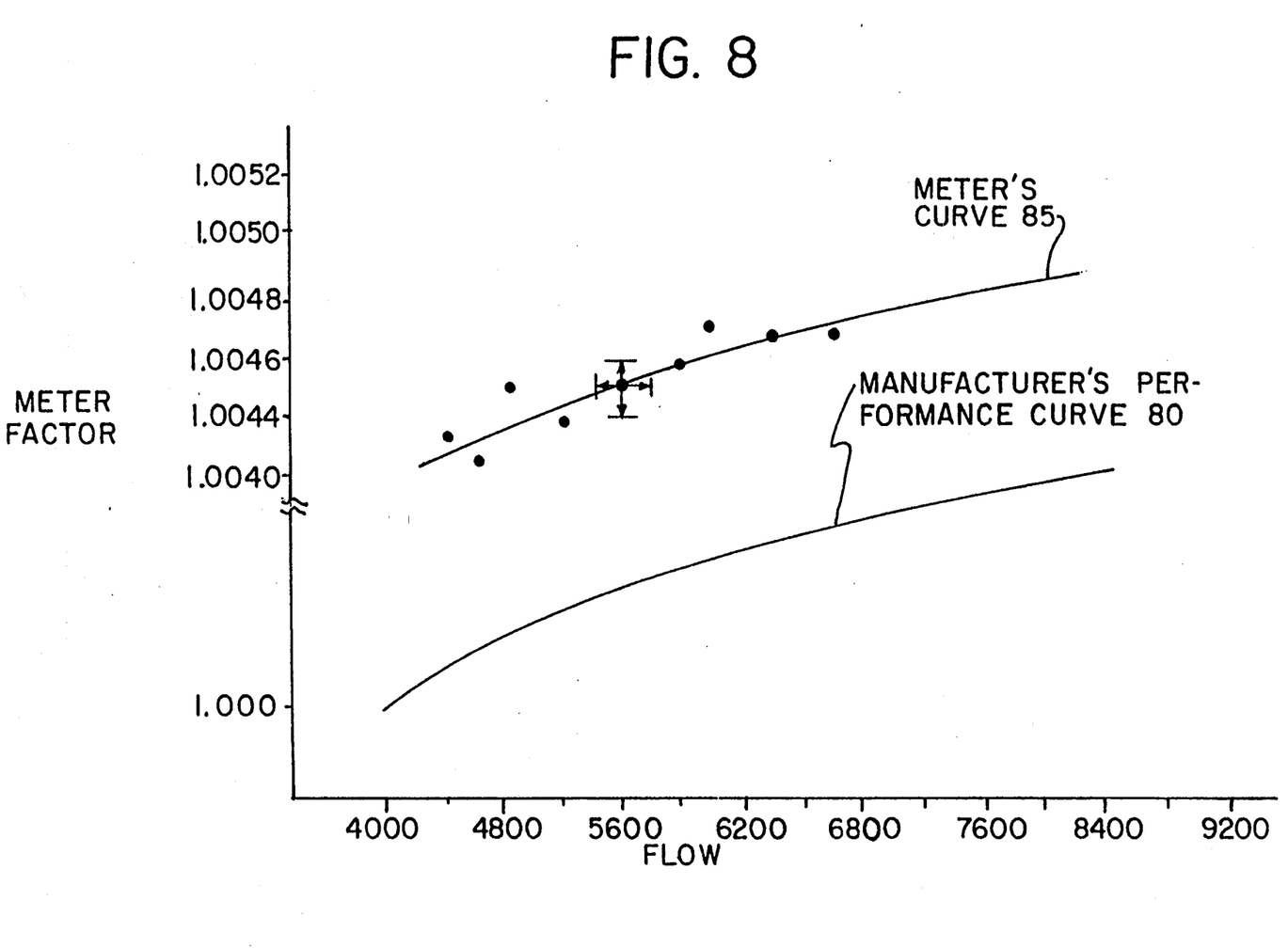
FIG. 8 are plots of the meter factor versus flow of proving of a meter and the plot of the manufacturer's performance curve for that meter.

Referring now to FIG. 8, there is shown a graph depicting the practice of the present invention in which data representative of the manufacturer's meter performance curve has been entered into computer 16 and plotter means 66 plots the performance curve 80. Data relating to the meter factor for meter 9 is accumulated, and is plotted by plotter means 66. A best fit curve 85 is projected through the data. In one series of experiments, a Macintosh ® computer was used with a curve fitting program "Cricketgraph". However, other computers and other computer programs for best fitting curves may be used.

The best fit logarithmic curve for meter's 9 curve 85, is compared with the manufacturer's performance curve 80. Should meter 9 be behaving properly, an offset should be reflected between the two curves 80 and 85, and curve 85 would pretty much track curve 80.

It should be noted that curve 80 is non-linear and thus, the accuracy of the meter is being tested against a non-linear curve whereas a conventional practice, it is tested against linear lines and of course, if the meter's curve is non-linear, it will introduce a certain degree of an inaccuracy to have it compared to a straight line.

Further, data points of meter 9 allows a meter factor error of plus or minus 0.003, while along the flow axis, there is an allowable error of 5% of flow value.

Computer means 16, as noted earlier, provides an error signal to indicating means 67. This occurs when a data point for meter 9 falls outside the error limits when compared with manufacturer's curve 80. Computer x,y plotter means 66 marks the data points that are outside of the error limits to indicate that meter 9 is out of spec. Indicating means 67 provides a visual indication-to an operator, when meter 9's data point is out of spec.

Normally, what happens in the industry when an out of spec reading occurs, meter 9 would have several proving trial runs. If meter 9 still continued to be out of spec, meter 9 would be replaced. However, under the present invention, since we are monitoring against the manufacturer's performance curve 80, meter 9 would be allowed to remain in service. At the next proving of meter 9, a reading is taken again. Now, assuming for instance, the problem with meter 9 is of the type such as a slightly nicked blade that creates an erroneous reading, meter 9 may still be acceptable. However, meter 9's reading has to be corrected in a greater magnitude for its erroneous reading. This is shown in FIG. 8 which shows a change in the offset occurring with a discontinuity between the plots of line 85 due to the damage done to the blade of meter 9. If meter 9 continues to track performance curve 80 fairly accurately, but at a different offset, meter 9 is still acceptable as a meter and may remain in service. Considerable money and time in the replacement of meter 9 is then saved.

BACKGROUND OF THE INVENTION

The apparatus and method proves to be the use of the pipeline carrying a petroleum fluid. A through-put pipe having a meter to be proved, and the bypass pipe are connected with valves to the pipe line so that petroleum fluid may be caused to fall either through the through put pipe or the bypass pipe. A prover is spatially arranged with a bypass pipe and measures a fluid flow in the bypass pipe. At least one sensor arranged with a through-put pipe senses a physical characteristic of the petroleum stream flowing the through-put pipe. A computer which includes memories having stored the meter's manufacturers' performance data, is at work for determining the type of curve generated by the stored performance data, a circuit for fitting data generated by the prover to the determined type of curve.

What is claimed is:

1. Proving apparatus for a meter used in a pipeline carrying a petroleum liquid comprising;
   a through-put pipe having the meter to be proved, said meter provides a signal corresponding to a sensed volume, of the petroleum liquid flowing in the through-put pipe;
   a bypass pipe;
   prover means, spatially arranged with the bypass pipe, for measuring a liquid flow in the bypass pipe and providing a prover signal representative thereof;
   valve means connecting the through-put pipe and the bypass pipe to the pipeline for controlling the flow of the petroleum liquid in a manner so as to cause petroleum liquid to flow either through the through-put pipe or through the bypass pipe;
   a plurality of sensor means spatially arranged with the through-put pipe, for sensing a plurality of physical characteristics of the petroleum liquid flowing in the through-put pipe and providing a plurality of characteristic signals corresponding to the sensed characteristics
   computer means connected to the meter, to the prover means and to each of the sensor means for proving the meter and including:
   means for storing the manufacturer's performance data of the meter,
   means for determining a type of curve generated by the stored performance data,
   means for fitting data generated by the prover signal from the prover means and the characteristic signal to the determined type of curve,
   means for determining a meter factor for the meter from the prover signal and each of the sensed characteristics;
   plotter means for plotting the meter factor data as the ordinate and each of the sensed characteristic data as the abscissia to define plural plots of the meter factor versus plural characteristics of the petroleum liquid; and
   means for comparing at least one meter factor value and at least one of the sensed data characteristics of the petroleum liquid to predetermined limits for that meter factor and for that data characteristic.

2. A method of proving a meter used in a pipeline carrying a petroleum liquid comprising the steps of:
   having the meter to be proved provide a signal corresponding to a sensed volume of the petroleum liquids flowing in a through-put pipe;
   using a bypass pipe;
   measuring a liquid flow in the bypass pipe with prover means which provides a prover signal representative thereof;
   controlling the flow of the petroleum liquid in a manner so as to cause a petroleum liquid to flow either through the through-put pipe or through the bypass pipe;
   sensing a plurality of physical characteristics of the petroleum liquid flowing in the throughput pipe, and providing a characteristic signal corresponding to each of the sensed characteristics;
   storing the manufacturer's performance data for the meter in a computer means;
   using the computer means to determine a type of curve generated by the stored performance data, and to fit data generated by the prover signal from the prover means and the characteristic signal to the determined type of curve;

determining a meter factor for the meter from the prover signal and each of the sensed characteristics;

plotting, on a plotter means, the meter factor data on the ordinate and each of the sensed characteristic data as the abscissia to define plural plots of the meter factor versus plural characteristics of the petroleum liquid; and comparing at least one meter factor value and at least one of the sensed data characteristics of the petroleum liquid to predetermined limits for that meter factor and for that data characteristic.

* * * * *